(12) United States Patent
Matsuyama (10) Patent No.: US 8,976,392 B2
(45) Date of Patent: Mar. 10, 2015

(54) INFORMATION PROCESSING APPARATUS HAVING HOT FOLDERS, METHOD OF CONTROLLING THE SAME, AND NON-TRANSITORY COMPUTER-READABLE MEDIUM

(71) Applicant: Canon Kabushiki Kaisha, Tokyo (JP)

(72) Inventor: Yoichi Matsuyama, Yokohama (JP)

(73) Assignee: Canon Kabushiki Kaisha (JP)

( * ) Notice: Subject to any disclaimer, the term of this patent is extended or adjusted under 35 U.S.C. 154(b) by 95 days.

(21) Appl. No.: 13/837,073

(22) Filed: Mar. 15, 2013

(65) Prior Publication Data

US 2013/0286432 A1 Oct. 31, 2013

(30) Foreign Application Priority Data

Apr. 25, 2012 (JP) ................................. 2012-100351

(51) Int. Cl.
*G06F 3/12* (2006.01)
(52) U.S. Cl.
CPC .............. *G06F 3/1296* (2013.01); *G06F 3/127* (2013.01); *G06F 3/1284* (2013.01); *G06F 3/1285* (2013.01); *G06F 3/1204* (2013.01)
USPC ........................................ 358/1.15; 358/1.13
(58) Field of Classification Search
CPC ................................ G06F 3/127; G06F 3/1261
See application file for complete search history.

(56) References Cited

U.S. PATENT DOCUMENTS

2006/0129717 A1* 6/2006 Farrell et al. ..................... 710/54
2007/0075990 A1* 4/2007 Sahashi et al. ................ 345/181
2007/0229895 A1* 10/2007 Fujimori et al. ............. 358/1.16
2009/0273808 A1* 11/2009 Kohli et al. .................. 358/1.15

FOREIGN PATENT DOCUMENTS

JP 2010257157 A 11/2010

* cited by examiner

*Primary Examiner* — King Poon
*Assistant Examiner* — Vincent Peren
(74) *Attorney, Agent, or Firm* — Rossi, Kimms & McDowell LLP (57) ABSTRACT

An information processing apparatus comprises: a unit which holds information of a plurality of hot folders; a unit which holds a condition for ranking the plurality of hot folders; a unit which generates a list of the plurality of hot folders ranked according to information of the plurality of hot folders, the condition, and information of print data input to a first hot folder of the plurality of hot folders, and to present the list; a unit which receives selection of a second hot folder as a movement destination of the print data input to the first hot folder from the plurality of hot folders indicated in the list; and a unit which moves the print data input to the first hot folder to the second hot folder.

6 Claims, 6 Drawing Sheets

| HOT FOLDER NAME | PRINT SETTINGS | NUMBER OF JOBS IN PROGRESS | PRINTER NAME | PRESENCE/ABSENCE OF DATA ACQUISITION FUNCTION OF PRINTER |
|---|---|---|---|---|
| HF1 | A | 10 | PRT02 | PRESENCE |
| HF2 | B | 2 | PRT03 | PRESENCE |
| HF3 | A | 6 | PRT02 | PRESENCE |
| HF4 | A | 4 | PRT01 | ABSENCE |

F I G. 6

600

| JOB ID | PRINT SETTINGS | PRINT DATA ACQUISITION MODE | PRINT DATA SIZE (MB) |
|---|---|---|---|
| 001 | A | PUSH | 400 |
| 002 | A | PULL | 800 |
| 003 | B | PULL | 200 |
| 004 | ABSENCE | PUSH | 100 |

FIG. 8

INFORMATION PROCESSING APPARATUS HAVING HOT FOLDERS, METHOD OF CONTROLLING THE SAME, AND NON-TRANSITORY COMPUTER-READABLE MEDIUM

BACKGROUND OF THE INVENTION

1. Field of the Invention

The present invention relates to an information processing apparatus, a method of controlling the same, and a non-transitory computer-readable medium and, more particularly, to a method of inputting print data to a hot folder provided by an information processing apparatus.

2. Description of the Related Art

There is available a method for inputting a print job to an image forming apparatus by using a hot folder. A hot folder associates print settings, which indicate with what settings input print data is printed, with an image forming apparatus which executes printing.

The user of a hot folder issues a print job to an image forming apparatus by inputting print data to the hot folder. The hot folder to which the print data is input transmits the print job with print settings to a corresponding image forming apparatus. As the number of corresponding image forming apparatuses and the number of print settings increase, the number of hot folders increases. This makes it difficult to select a hot folder for desired printing from such hot folders.

Japanese Patent Laid-Open No. 2010-257157 discloses a system which inputs not only print data but also print settings to a hot folder and executes printing if the print settings are the same as those set in the hot folder. In this case, if print settings different from those set in a hot folder as an input destination and print data are input to the hot folder, the input data is automatically moved to a hot folder having the same print settings as the input print settings and executed.

With the method disclosed in Japanese Patent Laid-Open No. 2010-257157, even if the user inputs print data to a hot folder with different print settings, it is possible to process the print data by moving it to a hot folder, other than the input destination, which is capable of processing the print data, without performing re-inputting operation for the data. In this method, however, since print data is automatically moved, if there are a plurality of hot folder candidates that are movement destinations or the user wants to cancel movement, he/she cannot control such an operation. In addition, the user cannot know the settings or statues of hot folders, and hence cannot select a proper hot folder.

SUMMARY OF THE INVENTION

According to one aspect of the present invention, there is provided an information processing apparatus which provides a hot folder to which print data is input to issue a print jot to an image forming apparatus, the apparatus comprising: a holding unit which holds information of a plurality of hot folders; a condition holding unit which holds a condition for ranking the plurality of hot folders; a list presentation unit which generates a list of the plurality of hot folders ranked according to information of the plurality of hot folders, the condition, and information of print data input to a first hot folder of the plurality of hot folders, and to present the list; a hot folder selection unit which receives selection of a second hot folder as a movement destination of the print data input to the first hot folder from the plurality of hot folders indicated in the list; and a moving unit which moves the print data input to the first hot folder to the second hot folder.

According to another aspect of the present invention, there is provided a method of controlling an information processing apparatus which provides a hot folder to which print data is input to issue a print jot to an image forming apparatus, the method comprising: holding information of a plurality of hot folders; holding a condition for ranking the plurality of hot folders; generating a list of the plurality of hot folders ranked according to information of the plurality of hot folders, the condition, and information of print data input to a first hot folder of the plurality of hot folders, and presenting the list; receiving selection of a second hot folder as a movement destination of the print data input to the first hot folder from the plurality of hot folders indicated in the list; and moving the print data input to the first hot folder to the second hot folder.

According to another aspect of the present invention, there is provided a non-transitory computer-readable medium storing a program for causing a computer to function as a holding unit configured to hold information of a plurality of hot folders, a condition holding unit configured to hold a condition for ranking the plurality of hot folders, a list presentation unit configured to generate a list of the plurality of hot folders ranked according to information of the plurality of hot folders, the condition, and information of print data input to a first hot folder of the plurality of hot folders, and to present the list, a hot folder selection unit configured to receive selection of a second hot folder as a movement destination of the print data input to the first hot folder from the plurality of hot folders indicated in the list, and a moving unit configured to move the print data input to the first hot folder to the second hot folder.

The present invention allows to move print data to a proper hot folder reflecting the intention of the user without requiring re-inputting operation for the print data.

Further features of the present invention will become apparent from the following description of exemplary embodiments (with reference to the attached drawings).

DESCRIPTION OF THE EMBODIMENTS

First Embodiment

The first embodiment of the present invention will be described below with reference to the accompanying drawings.

[Hardware Arrangement]

Figure 2:
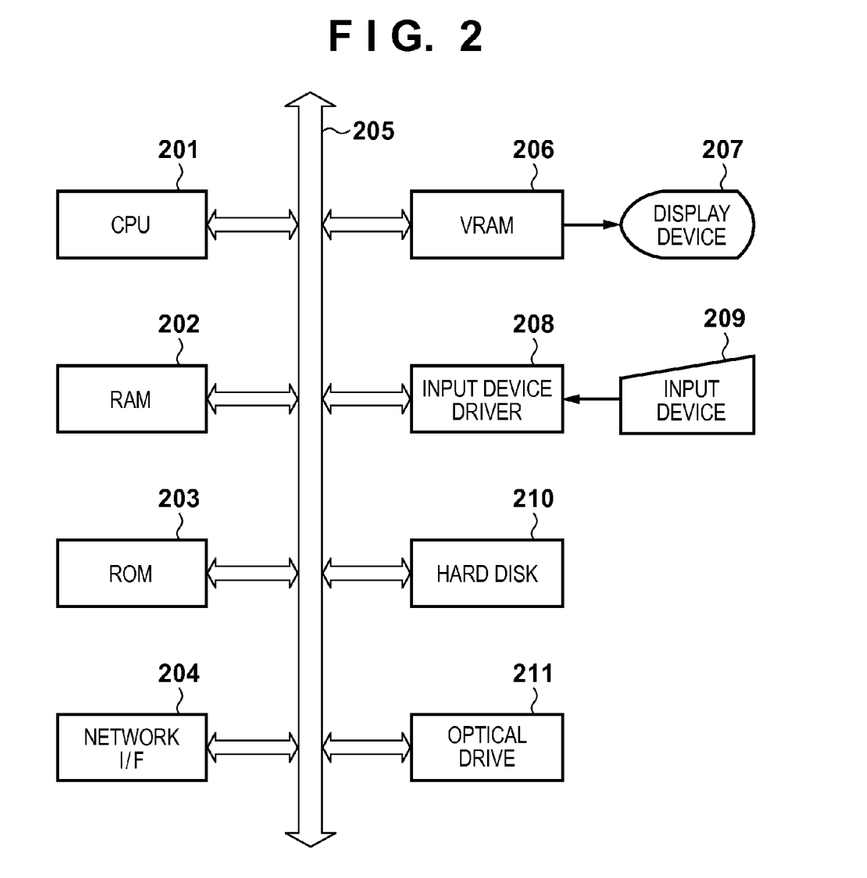
FIG. 2 is a block diagram showing an example of the hardware arrangement of an information processing apparatus.

FIG. 2 shows an example of the hardware arrangement of an information processing apparatus which provides hot folders. In the information processing apparatus, a CPU 201 controls the overall information processing apparatus. A RAM 202 is a storage area used as, for example, a work area for programs. A ROM 203 is a storage area holding programs and the like.

A network I/F 204 is an interface for connecting the information processing apparatus to a network to communicate with an external apparatus. In this case, the network may be either wired or wireless. A VRAM 206 is a storage area which holds various types of data to be displayed on a display device 207 connected to the information processing apparatus. An input device driver 208 is a device driver for controlling an input device 209 and is held in correspondence with the input device 209.

A hard disk 210 is a storage area for holding programs and various types of data. An optical drive 211 is a device which can read out data from a storage medium such as a compact disk and write data on it. The respective constituent elements of the above information processing apparatus are connected to each other via a system bus 205 and can transmit/receive data to/from each other.

Note that the above arrangement of the information processing apparatus is an example, and may include other constituent elements or some constituent elements may be omitted as needed. As this information processing apparatus, for example, a general personal computer (PC) can be used.

[Module Arrangement]

Figure 1:
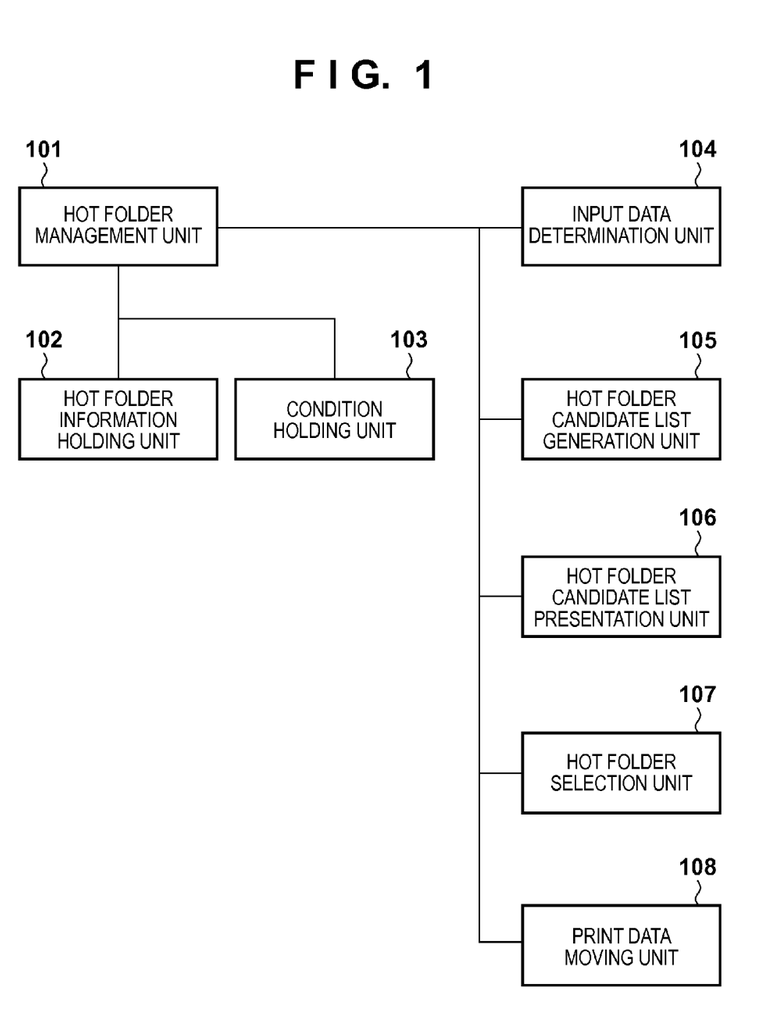
FIG. 1 is a block diagram showing an example of a module arrangement.

FIG. 1 shows a module arrangement according to the present invention, which operates on the hardware of the information processing apparatus shown in FIG. 2. Each module is stored in the hard disk 210 or the like which serves as a storage unit, and is read out from the RAM 202 and operates by being executed by the CPU 201.

A hot folder management unit 101 performs management, monitoring, and the like of generation and deletion of hot folders and inputting of print data to hot folders. A hot folder information holding unit 102 associates print setting information designated at the time of generation of a hot folder with an image forming apparatus and performs input/output operation for various types of information such as the number of jobs in progress to/from a storage unit (for example, the hard disk 210).

A condition holding unit 103 holds conditions for deciding the order of hot folders when a list of hot folders (to be referred to as a hot folder candidate list hereinafter) is generated. In this case, a hot folder candidate list is a list to be used when the print data input to a given hot folder (the first hot folder) is moved to another hot folder (the second hot folder). A concrete example of a hot folder candidate list will be described later. In addition, in this embodiment, hot folders which satisfy predetermined conditions are ranked high in priority order and positioned near the head of a hot folder candidate list. An example of a condition will be described later with reference to FIG. 3.

An input data determination unit 104 determines whether actual data is directly input as print data input to a hot folder or reference information to be used when referring to actual data in another location is input.

A hot folder candidate list generation unit 105 generates a hot folder candidate list from various types of information. Information to be used in this case includes, for example, information concerning input print data, information held by the hot folder information holding unit 102 and the condition holding unit 103, and the remaining amount of the hard disk 210.

A hot folder candidate list presentation unit 106 presents the user with the hot folder candidate list generated by the hot folder candidate list generation unit 105. This hot folder candidate list is presented to the user via the display device 207 of the information processing apparatus.

A hot folder selection unit 107 receives the hot folder selected by the user as the movement destination of the input print data from the hot folder candidate list.

A print data moving unit 108 moves the print data from the hot folder to which the print data is input to the hot folder received by the hot folder selection unit 107.

An example of the condition held in the condition holding unit 103 will be described with reference with reference to FIG. 3. A condition 300 "NOT_COMPLETED_JOB_COUNT" shown in FIG. 3 indicates that the number of jobs which are not completed and are being processed in a hot folder is set as a reference. In addition, "<" indicates that the smaller the numerical value, the higher the priority level.

For example, the following are conditions as other references:
HOTFOLDER_NAME (hot folder name)
PRINTER_SETTING (print setting)
HOTFOLDER_STATUS (hot folder status)
PRINTER_NAME (corresponding printer name)
CAN_PRINTER_PULL (presence/absence of data acquisition function of corresponding printer)

Setting each condition can control the ranking of hot folder candidates in an initial state which are included in a hot folder candidate list. Note that a condition for deciding an order is not limited to that described above and may be other conditions. Alternatively, a combination of a plurality of conditions may be used.

Figure 3:
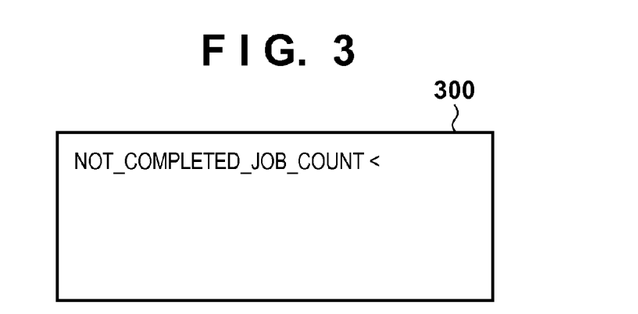
FIG. 3 is a view showing an example of a condition for ranking hot folders.

Assume that the condition for ranking shown in FIG. 3 is defined in advance. The user may change the condition as needed.

[Flowchart for Generation of Hot Folder Candidate List]

Figure 4:
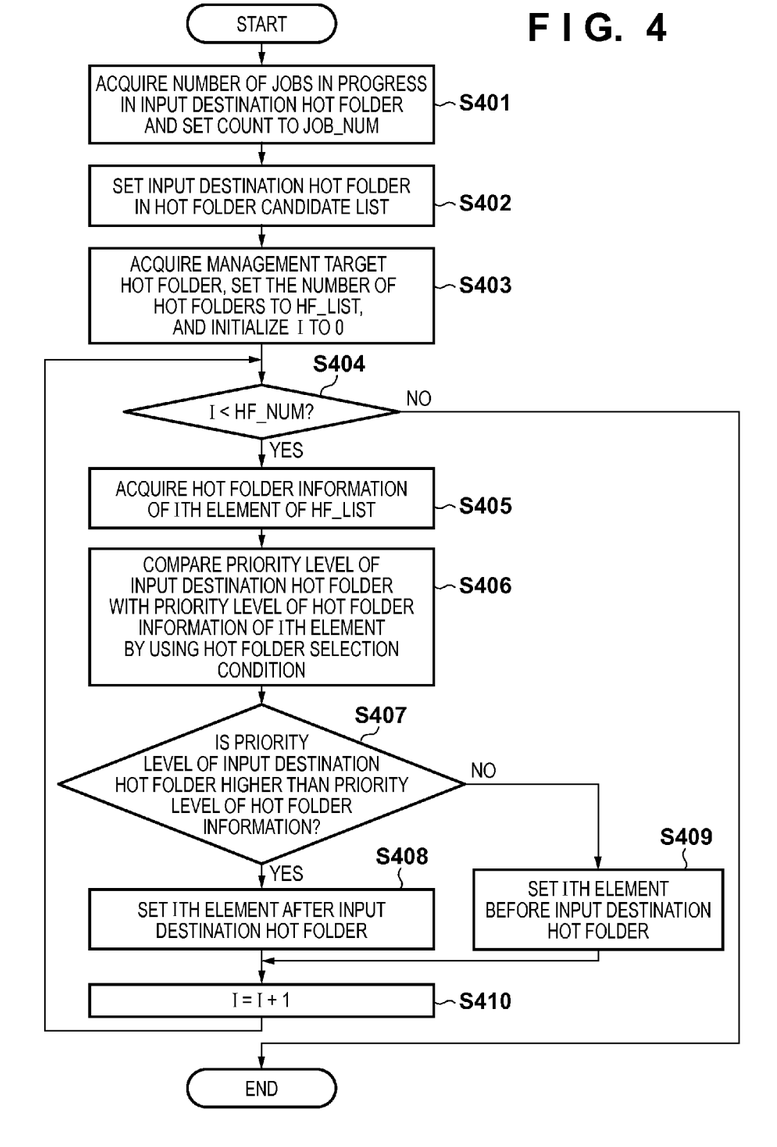
FIG. 4 is a flowchart for hot folder candidate list generation processing.

FIG. 4 is a flowchart for the generation of a hot folder candidate list by the hot folder candidate list generation unit 105 in this embodiment. Note that in this embodiment, the CPU 201 of the information processing apparatus implements this flowchart by reading out the programs stored in the ROM 203 or the like to the RAM 202 and executing them.

When print data is input to a hot folder, this flowchart starts. In step S401, the hot folder candidate list generation unit 105 acquires the number of jobs in progress in a hot folder as an input destination of print data (to be referred to as an input destination hot folder hereinafter) and sets a variable JOB_NUM.

In step S402, the hot folder candidate list generation unit 105 sets an input destination hot folder in the hot folder candidate list. The hot folder candidate list generation unit 105 acquires input destination hot folder information from a hot folder information management table 500 shown in FIG. 5, and sets the information at the head of the hot folder candidate list.

Figure 5:
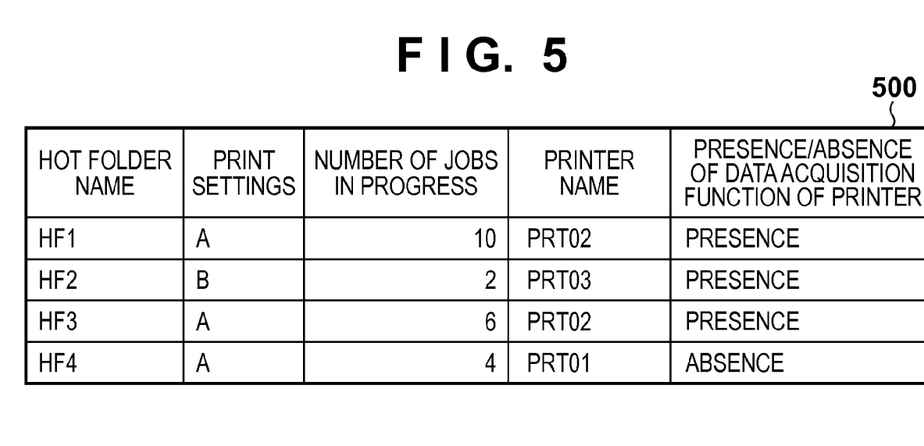
FIG. 5 is a view showing an example of a hot folder information management table.

In step S403, the hot folder candidate list generation unit 105 acquires a hot folder to be managed from the hot folder information management table 500, and sets the folder to a variable HT_LIST. In this case, a hot folder to be managed indicates a hot folder to be included in a hot folder candidate list. The hot folder candidate list generation unit 105 also sets the number of hot folders to be managed to a variable HF_NUM. The hot folder candidate list generation unit 105 then initializes a variable I to 0.

In step S404, the hot folder candidate list generation unit 105 determines whether the value of the variable I is smaller than the value of the variable HF_NUM. If the variable I is smaller than the variable HF_NUM (YES in step S404), the process advances to step S405. If the variable I is equal to or more than the variable HF_NUM (NO in step S404), the hot folder candidate list generation unit 105 terminates the processing.

In step S405, the hot folder candidate list generation unit 105 acquires hot folder information corresponding to the Ith element of a variable HF_LIST from the hot folder information management table 500.

In step S406, the hot folder candidate list generation unit 105 determines which folder has a higher priority level, based on the hot folder information of the input destination hot folder and the hot folder information of the hot folder corresponding to the Ith element of HF_LIST and the condition 300.

If the hot folder candidate list generation unit 105 determines in step S407 that the input destination hot folder has a higher priority level (YES in step S407), the process advances to step S408. If the input destination hot folder has a lower priority level (NO in step S407), the process advances to step S409.

In step S408, the hot folder candidate list generation unit 105 sets the hot folder corresponding to the Ith element of HF_LIST after the input destination hot folder in the hot folder candidate list. The hot folder candidate list generation unit 105 sequentially compares the priority level of the hot folder corresponding to the Ith element with the priority level of each hot folder located after the input destination hot folder in the list. The hot folder candidate list generation unit 105 then inserts the hot folder corresponding to the Ith element immediately before a hot folder having a lower priority level than the hot folder corresponding to the Ith element in the hot folder candidate list. That is, hot folders are ranked such that hot folders having higher priority levels are located closer to the head of the list, and hot folders having lower priority levels are located closer to the end of the list.

In step S409, the hot folder candidate list generation unit 105 sets the hot folder corresponding to the Ith element of HF_LIST before the input destination hot folder. In addition, the hot folder candidate list generation unit 105 sequentially compares the priority level of the hot folder corresponding to the Ith element with that of each hot folder located before the input designation hot folder in the list. The hot folder candidate list generation unit 105 inserts the hot folder corresponding to the Ith element immediately after a hot folder having a higher priority level than the hot folder corresponding to the Ith element in the hot folder candidate list.

In step S410, the hot folder candidate list generation unit 105 increments the variable I by one and returns to step S404 to process the next management target hot folder. The hot folder candidate list generation unit 105 repeats the processing until all the management target hot folders are processed.

Note that the flowchart of FIG. 4 corresponds to a case in which the condition 300 shown in FIG. 3 is used as a condition for determining priority levels. If a different condition is to be used, for example, the processing contents in step S401 are changed.

[Hot Folder Designation Dialog]

Figure 7:
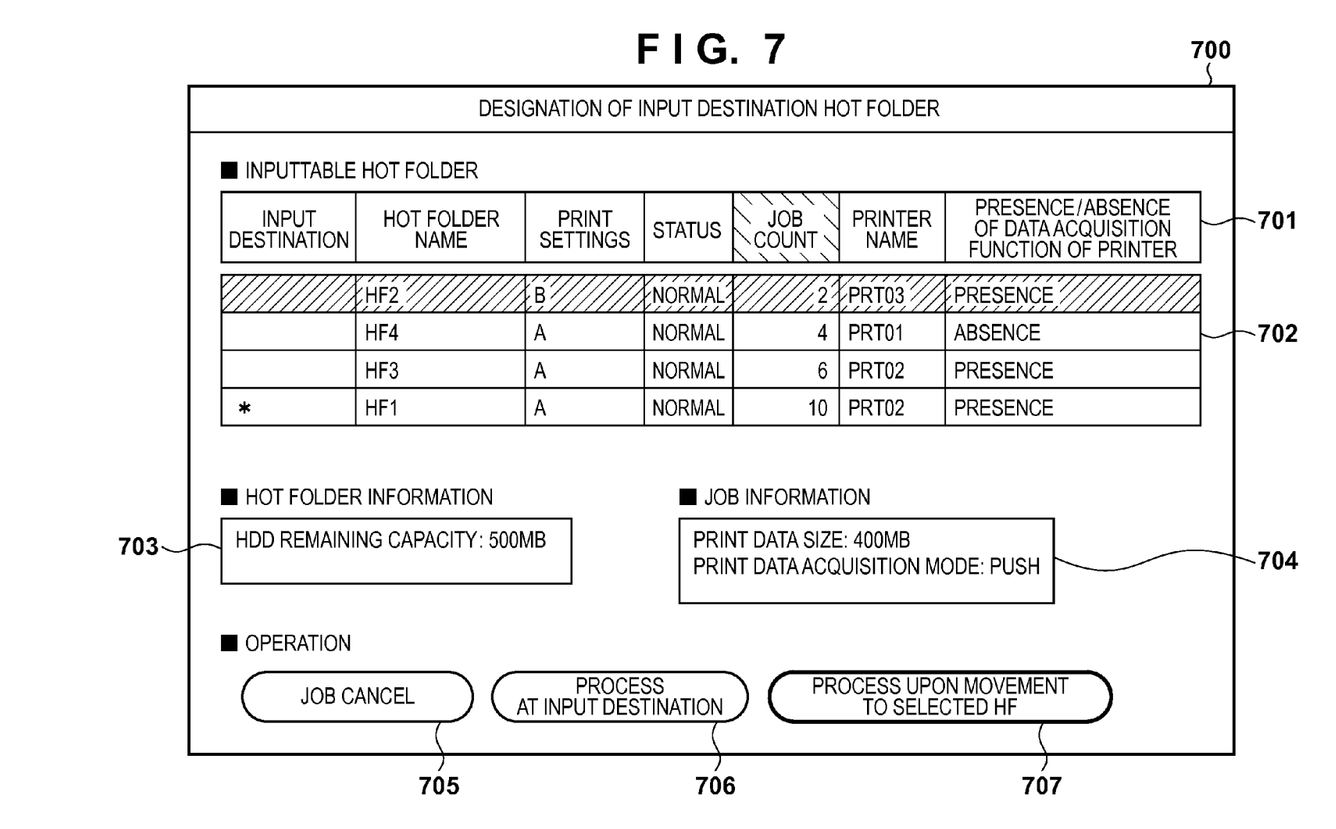
FIG. 7 is a view showing an example of a hot folder candidate selection dialog.
Figure 8:
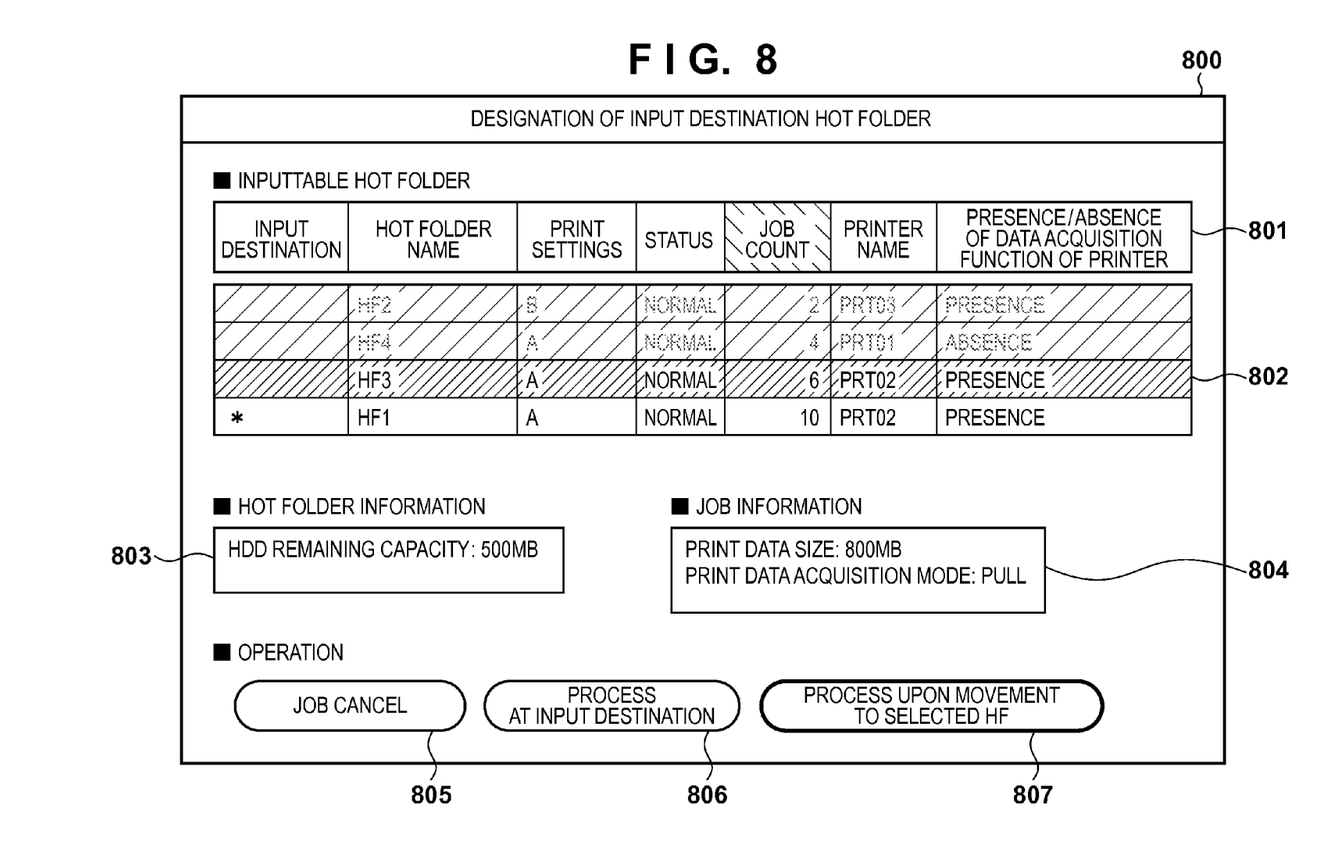
FIG. 8 is a view showing an example of a hot folder candidate selection dialog.

The apparatus presents the user with the hot folder candidate list generated according to the flowchart of FIG. 4, hot folder information, and job information in the form of a dialog, and makes the user designate the operation of moving data. FIGS. 7 and 8 each show an example of a hot folder designation dialog.

Hot Folder Candidate List

Presentation Example 1

Various types of tables managed by the information processing apparatus according to the present invention will be described first. A hot folder information management table is used to manage values indicating the settings and statuses of hot folders. FIG. 5 shows an example of the hot folder information management table 500. The items registered in the hot folder information management table 500 include the items of hot folder name, hot folder print settings, the number of jobs in progress, image forming apparatus name, and presence/absence of data acquisition function of image forming apparatus.

Character strings such as "HF1" and "PRT01" registered as a registered name such as a printer driver are entered in the items of hot folder name and image forming apparatus name (printer name). Character strings (for example, A and B) indicating combinations of print settings such as paper sizes, paper types, and numbers of copies are entered in the item of print settings. Combinations of print settings are defined in other places, and a description of them will be omitted.

Values indicating the number of jobs in progress in hot folders are entered in the item of the number of jobs in progress. Character strings of "presence" or "absence" are entered in the item of presence/absence of data acquisition function of image forming apparatus in accordance with the presence/absence of the data acquisition functions of image forming apparatuses corresponding to hot folders. Note that the data acquisition function indicates a function capable of acquiring actual data from a reference destination by using reference information for the reference of actual data.

Figure 6:
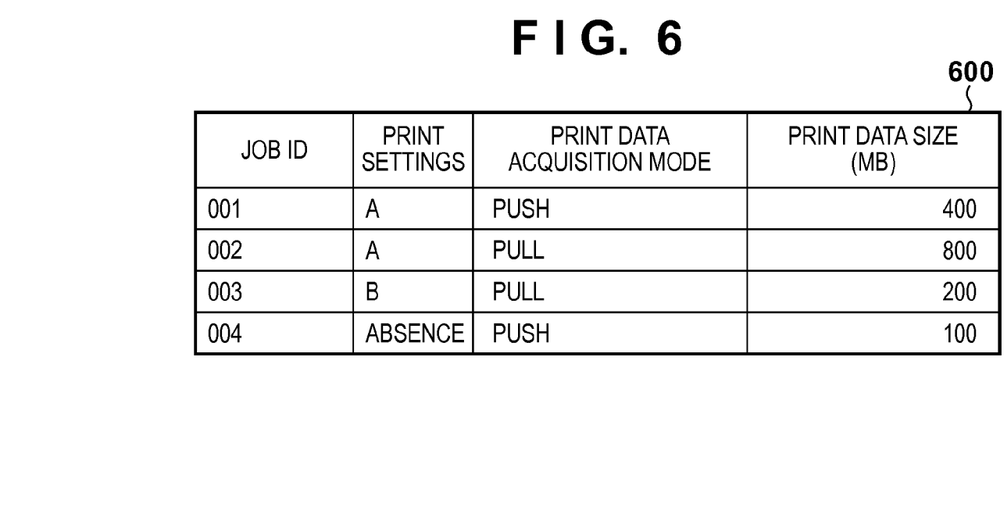
FIG. 6 is a view showing an example of job information management table.

In addition, a job information management table is used to manage the print data input to hot folders. FIG. 6 shows an example of a job information management table 600. The items of job ID, print settings, print data acquisition mode, and print data size are registered in the job information management table 600.

An identifier for uniquely identifying a job is entered in the item of job ID. The same character string as that in the printing setting column of the hot folder information management table 500 is entered in the item of print settings. The character string "PUSH" or "PULL" is entered in the item of print data acquisition mode in accordance with the method of inputting print data by the user. For example, the input data determination unit 104 determines whether the user has input actual data or reference information for actual data as print data. A character string to be entered in the above item is set based on this determination result. A numerical value indicating the file size of print data in MB is entered in the item of print data size.

Note that the arrangements of hot folder information management table 500 and job information management table 600 are not limited to those described above, and may include other items.

The following is a description about the operation to be performed when the print data of the job ID "001" in the job information management table 600 in FIG. 6 is input to the hot folder with the hot folder name "HF1" in the state of the hot folder information management table 500 in FIG. 5.

FIG. 7 shows an example of the hot folder selection dialog to be displayed in this case. The upper part of a hot folder selection dialog 700 displays an item name display portion 701 of inputtable hot folder information and an inputtable hot folder list 702. The list displayed here corresponds to the hot folder candidate list generated by the flowchart of FIG. 4.

The intermediate part of the hot folder selection dialog 700 displays hot folder information 703 and job information 704. The hot folder information 703 displays the remaining capacity of an HDD (storage area). The HDD in this case indicates an available capacity of the capacity assigned to hot folders. The storage area assigned to each hot folder is ensured in, for example, the storage area of the hard disk 210. In addition, the job information 704 displays the size of print data input to a hot folder and a print data acquisition mode.

A print data acquisition mode is set depending on what type of print data is input to the hot folder. This corresponds to the 5 print data acquisition modes in the job information management table 600 shown in FIG. 6. If the determination result obtained by the input data determination unit 104 indicates that the entity of data (actual data) is input as print data, the print data acquisition mode is "PUSH". If this result indicates that reference information for actual data is input as print data, the print data acquisition mode is "PULL". In this case, it is necessary to acquire actual data from a hot folder or a corresponding image forming apparatus.

The lower part of the hot folder selection dialog 700 displays a cancel button 705 and processing buttons 706 and 707. When the user selects the cancel button 705, the input of print data itself is canceled. When the user selects the processing button 706, the apparatus executes processing in the hot folder corresponding to the symbol "*" attached to the column corresponding to "input designation" of the item name display portion 701. A hot folder indicated by the symbol "*" is the one to which print data is input. When the user selects the processing button 707, the apparatus moves the print data to the hot folder selected in the inputtable hot folder list 702 and executes processing.

The order of hot folders displayed in the inputtable hot folder list 702 is determined depending on which item of the item name display portion 701 is selected. In this case, the hot folders are displayed by default from the top to the bottom of the list in ascending order of the numbers of jobs in progress according to the condition 300 shown in FIG. 3. Referring to FIG. 7, graying out the item "job count" of the item name display portion 701 indicates that the hot folders are sorted according to the job counts. If the user selects another item, the apparatus changes the display order (the order of the hot folders) in the inputtable hot folder list 702 in accordance with the selected item. That is, although the default display order in the inputtable hot folder list 702 depends on the condition shown in FIG. 3, the user can change the display order based on another condition by selecting and instructing any of the items in the item name display portion 701.

The rows of the inputtable hot folder list 702 change in accordance with the values of the hot folder information 703 and job information 704. More specifically, if the print data acquisition mode of the job information 704 is "PUSH" and the HDD remaining capacity (500 MB) is larger than the print data size (400 MB), all the hot folder columns whose statuses are not errors are selectable.

In contrast, if the HDD remaining capacity is smaller than the print data size (400 MB), all the hot folder columns displayed in the inputtable hot folder list 702 are grayed out to indicate that they cannot be selected. In this case, the processing buttons 706 and 707 are also grayed out to inhibit selection, and only job cancellation can be executed with the cancel button 705. Note that a hot folder, of the respective hot folders displayed in the list, which cannot be selected may be indicated by deleting the corresponding row itself instead of being grayed out.

Referring to FIG. 7, consider a case in which although "HF2" in correspondence with which printing settings B are set is selected, the user wants to use print settings "A" and perform printing as soon as possible. In this case, the user selects "HF4" in correspondence with which printing settings "A" and the job count "4" are set. The user then sets the column of "HF4" in the inputtable hot folder list 702 in a selected state (highlighted display) and selects the processing button 707. With this operation, the apparatus moves the print data to "HF4" and issues a print job to a printer PRT01 with the print settings A.

Hot Folder Candidate List

Presentation Example 2

The following description made with reference to FIG. 8 concerns the operation to be performed when print data with the job ID "002" of the job information management table 600 is input to the hot folder with the hot folder name "HF1" in the state of the hot folder information management table 500 in FIG. 5. A description of the same portion as that of the hot folder selection dialog 700 shown in FIG. 7 will be omitted.

The rows of an inputtable hot folder list 802 change in accordance with the values of hot folder information 803 and job information 804. More specifically, if the print data acquisition mode of the job information 804 is "PULL" and the HDD remaining capacity (500 MB) is smaller than the job data size (800 MB), the apparatus performs display operation to indicate which of the hot folders is selectable.

In this case, only a hot folder is selectable, which corresponds to an image forming apparatus having a data acquisition function. This is because, since the hot folder corresponding to the information processing apparatus cannot hold print data due to the available capacity of the storage area, the image forming apparatus needs to directly acquire print data. In the inputtable hot folder list 802 in FIG. 8, therefore, "HF1", "HF2", and "HF3" are selectable. However, "HF2" has the status "error", and hence becomes unselectable. As a result, only "HF1" and "HF3" are selectable.

The apparatus sets "HF3" or "HF1" in the inputtable hot folder list 802 in a selected state. The user then selects a processing button 807. With this operation, the apparatus moves the print data to the hot folder selected in the inputtable hot folder list 802, and processes the data.

As described above, according to the present invention, it is possible to move print data to a proper hot folder reflecting the intention of the user without requiring re-inputting operation for the print data.

Second Embodiment

This embodiment will exemplify a case in which it is possible to designate operation with the hot folder designation dialog exemplified in the first embodiment when there is only one selectable hot folder. The second embodiment displays an option window which allows to make setting for the designation of operation.

The option settings in this embodiment are made to allow to set "manual" or "automatic" when there is only one selectable hot folder. When the user sets "manual" with the option settings, the apparatus always displays a hot folder designation dialog as in the first embodiment.

In contrast, when the user sets "automatic" with the option settings, the apparatus does not display the hot folder designation dialog when there is only one selectable hot folder. The apparatus then performs processing with this one selectable hot folder. Note that one selectable hot folder in this case is a hot folder to which print data is input. This corresponds to a case in which the list includes no other hot folders which can be selected as the movement destination of print data.

With the above settings, if the list includes only hot folder to which print data is input, the apparatus causes the hot folder to which the print data is input to issue a job without displaying the hot folder designation dialog.

In addition to the effect of the first embodiment, the second embodiment has the effect of saving the selection of a hot folder when print data is input to a hot folder.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-100351, filed Apr. 25, 2012, which is hereby incorporated by reference herein in its entirety.

What is claimed is:

1. An information processing apparatus which provides a hot folder to which print data is input to issue a print job to an image forming apparatus, the apparatus comprising:
    at least one non-transitory memory device;
    at least one processor;
    a holding unit which holds information of a plurality of hot folders;
    a condition holding unit which holds a condition for ranking the plurality of hot folders;
    a list presentation unit which generates a list of the plurality of hot folders ranked according to information of the plurality of hot folders, the condition, and information of print data input to a first hot folder of the plurality of hot folders, and to present the list;
    a hot folder selection unit which receives selection of a second hot folder as a movement destination of the print data input to the first hot folder from the plurality of hot folders indicated in the list; and
    a moving unit which moves the print data input to the first hot folder to the second hot folder,
    wherein if the print data input to the first hot folder is reference information for actual data, said list presentation unit presents a hot folder corresponding to an image forming apparatus having a function of acquiring actual data by using the reference information so as to allow the hot folder to be selected as the second hot folder, and
    wherein the holding unit, the condition holding unit, the list presentation unit, the hot folder selection unit, and the moving unit are implemented at least in part by the at least one processor executing a program recorded on the at least one non-transitory memory device.

2. The apparatus according to claim 1, wherein if there is no hot folder configured to be selected as the second hot folder of the plurality of hot folders included in the list, a print job of the print data input is issued by the first hot folder without presentation of the list.

3. The apparatus according to claim 1, wherein the list presentation unit receives an instruction to sort the plurality of hot folders presented in the list and presents a list of the plurality of hot folders sorted according to a condition indicated by the instruction.

4. The apparatus according to claim 1, wherein the condition comprises a condition concerning one of an available capacity of a storage area which holds print data assigned to a hot folder, the number of jobs in progress in the hot folder, a print setting assigned to the hot folder, and a status of the hot folder.

5. A method of controlling an information processing apparatus which provides a hot folder to which print data is input to issue a print job to an image forming apparatus, the method comprising:
    holding information of a plurality of hot folders;
    holding a condition for ranking the plurality of hot folders;
    generating a list of the plurality of hot folders ranked according to information of the plurality of hot folders, the condition, and information of print data input to a first hot folder of the plurality of hot folders, and presenting the list;
    receiving selection of a second hot folder as a movement destination of the print data input to the first hot folder from the plurality of hot folders indicated in the list; and
    moving the print data input to the first hot folder to the second hot folder,
    wherein if the print data input to the first hot folder is reference information for actual data, a hot folder corresponding to an image forming apparatus having a function of acquiring actual data by using the reference information so as to allow the hot folder to be selected as the second hot folder is presented.

6. A non-transitory computer-readable medium storing a program for executing a method of controlling an information processing apparatus which provides a hot folder to which print data is input to issue a print job to an image forming apparatus, the method comprising:
    holding information of a plurality of hot folders;
    holding a condition for ranking the plurality of hot folders;
    generating a list of the plurality of hot folders ranked according to information of the plurality of hot folders, the condition, and information of print data input to a first hot folder of the plurality of hot folders, and presenting the list;
    receiving selection of a second hot folder as a movement destination of the print data input to the first hot folder from the plurality of hot folders indicated in the list; and
    moving the print data input to the first hot folder to the second hot folder,
    wherein if the print data input to the first hot folder is reference information for actual data, a hot folder corresponding to an image forming apparatus having a function of acquiring actual data by using the reference information so as to allow the hot folder to be selected as the second hot folder is presented.

* * * * *